United States Patent [19]

Svensson

[11] Patent Number: 5,055,003

[45] Date of Patent: Oct. 8, 1991

[54] LIQUID DRIVEN JET PUMP

[75] Inventor: Gösta Svensson, Stockholm, Sweden

[73] Assignee: Teknovia AB, Stockholm, Sweden

[21] Appl. No.: 548,967

[22] PCT Filed: Feb. 3, 1989

[86] PCT No.: PCT/SE89/00040

§ 371 Date: Aug. 6, 1990

§ 102(e) Date: Aug. 6, 1990

[87] PCT Pub. No.: WO89/07203

PCT Pub. Date: Aug. 10, 1989

[30] Foreign Application Priority Data

Feb. 5, 1988 [SE] Sweden ............... 8800385

[51] Int. Cl.[5] ............................. F04F 5/48
[52] U.S. Cl. ................... 417/191; 417/196;
417/198; 137/860; 239/432
[58] Field of Search ........... 417/196, 198, 191, 151;
239/518, 428.5, 432, 504, 499; 137/860

[56] References Cited

U.S. PATENT DOCUMENTS

| 2,741,997 | 4/1956 | Parker | 417/191 |
| 3,529,421 | 9/1970 | Neeley | 417/191 |
| 3,902,671 | 9/1975 | Symmons | 239/432 |
| 4,014,961 | 3/1977 | Popov | 239/432 |
| 4,487,553 | 12/1984 | Nagata | 417/196 |
| 4,637,552 | 1/1987 | Finkbeiner et al. | 239/432 |

FOREIGN PATENT DOCUMENTS 16055 of 1904 Australia ................... 239/432

Primary Examiner—Richard A. Bertsch
Assistant Examiner—Michael I. Kocharov
Attorney, Agent, or Firm—Fleit, Jacobson, Cohn, Price, Holman & Stern

[57] ABSTRACT

A liquid driven pump has a driving-liquid accelerating nozzle which opens into a pump chamber having an outlet part positioned coaxially with the nozzle. Opening into the pump chamber is an evacuation line which is intended for connection to a space to be evacuated. The outlet part of the pump chamber discharges into a coaxial drainage chamber and has an abrupt increase in cross sectional area in relation to the outlet part. The drainage chamber has downstream net-like elements which are passed through by the liquid. The relationship between the smallest cross sectional areas of the nozzle and the outlet part respectively and the distance between the nozzle orifice and the drainage chamber are such that essentially the whole of the diffusion process takes place through the agency of the net-like elements. The smallest cross sectional area of the outlet part is from 1.4 to 4.8 times larger than the nozzle orifice area, and the drainage orifice is substantially circular in shape having an area which exceeds the total open mesh area of the net-like elements and which is from 15 to 45 times larger than the area of the nozzle orifice.

8 Claims, 2 Drawing Sheets

LIQUID DRIVEN JET PUMP

The present invention relates to a liquid driven jet pump of the kind which includes a nozzle which is intended to accelerate the drive liquid and which discharges into a pump chamber having an outlet part which is substantially coaxial with the acceleration nozzle, the nozzle orifice area being smaller than the smallest cross-sectional area of the outlet part, an evacuation line which opens out into the pump chamber and which is intended for connection to the space to be evacuated, wherein the outlet part of said pump chamber discharges into a drainage chamber which is substantially coaxial with the outlet part and which has a cross-sectional area which increases abruptly in relation to the outlet part and which, when measured perpendicularly to the axial direction of the outlet part is much larger than the area of the outlet part, and said drainage chamber having a drain orifice which determines the shape of the exiting jet.

Jet pumps that are driven by water under pressure and fitted directly to the tap locations of water delivery pipes are often used in laboratories to pump away gases. In the case of jet pumps of this kind, the water first flows through a nozzle, in which the water is accelerated to a high velocity. The water then enters a pump chamber as a jet which cooperates with a gas inlet line. The jet of water collides with gas molecules in the pump chamber and the molecules are entrained by the water into a diffusor, which is normally in the form of a long pipe whose cross-sectional area increases gradually in the direction of flow. In order to prevent the water jet from exiting too powerfully and causing splashing, it is necessary to increase the cross-sectional area of the diffusor to at least 15 times the area of the nozzle orifice. Since, for reasons of a technical nature concerning flow, this increase in the cross-sectional area of the diffusor must take place very gradually, the diffusor, and therewith also the jet pump, will have unduly long length dimensions. The jet pump will normally block-off the tap location, such as to prevent its use for other purposes.

The object of the invention is to provide a novel and advantageous pump whose length dimension is so small as to create practically no obstruction at the tap location, while still producing a high degree of efficiency, a high final vacuum and a gentle and collected jet.

To this end, it is proposed in accordance with the invention that in the case of a jet pump of the aforedescribed kind, the ratio between the smallest cross-sectional areas of the nozzle and the outlet part respectively and the distance between the nozzle orifice and the drainage chamber are mutually so adapted that the whole of the diffusion process, or at least the most predominant part of said process, takes place with the aid of a multiple of net-like elements which are located in the drainage chamber and through-passed by the liquid; that the smallest cross-sectional are of the outlet part is from 1.4 to 4.8 times as large as the area of the nozzle orifice; and that the area of the drain orifice is from 15 to 45 times larger than the area of the nozzle orifice. A pump of this construction can be given a length of such small dimension and will produce a water jet which is so gentle and so collected and compact, irrespective of whether the evacuation line communicates with the surroundings or is connected to a vessel or some like device to be evacuated, such as to enable the pump to be fitted permanently to, e.g., a conventional tap fitting for laboratory or domestic use, all to no disadvantage.

A particular advantage is afforded when the smallest cross-sectional area of the outlet part is from 2 to 3 times greater than the area of the nozzle orifice, when the total area of the holes in a perforated plate located in the drainage chamber on the upstream side of the net-like elements is from 5 to 15 times larger, when the open mesh area of the net-like elements is 6 to 20 times, preferably 8 to 16 times, larger than the area of the nozzle orifice, and when the drain orifice is from 20 to 40 times larger than the area of the nozzle orifice. The distance between the nozzle orifice and the drain orifice will suitably be less than six times the square root of the area of the drain orifice. Further characteristic features of the invention and advantages afforded thereby are set forth in the following description of two embodiments thereof illustrated by way of example only in the accompanying drawings.

Figure 1:
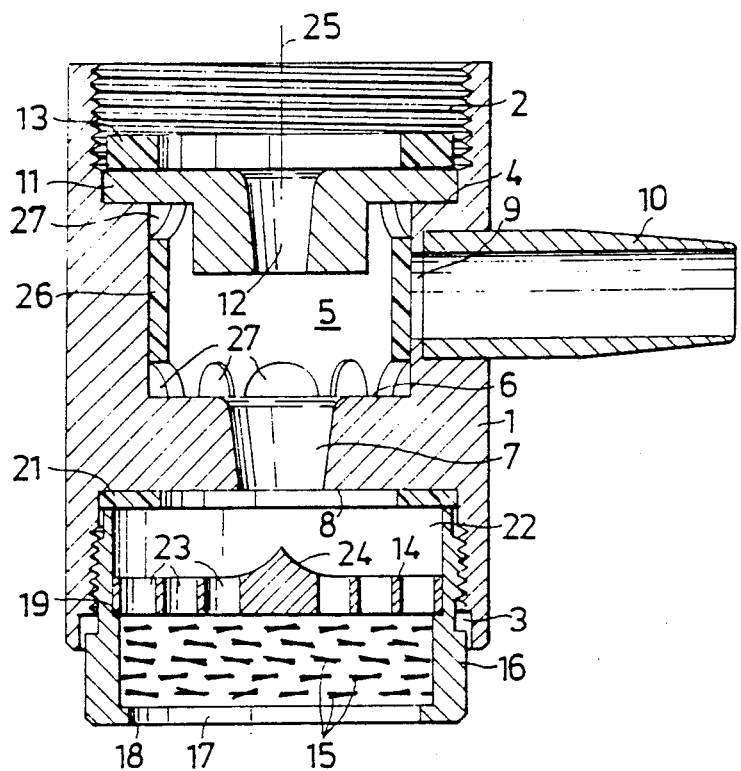
FIG. 1 is an axially sectional view of a first embodiment of the inventive liquid-driven pump.

The jet pump illustrated in FIG. 1 comprises a cylindrical pump body 1, which may be made of a plastic material or of metal and which has an axial, screw-threaded bores 2 and 3 provided at respective opposite ends thereof. The bore 2 adjoins, via a circular seat 4, a chamber which includes an upper cylindrical part 5, which adjoins a lower part 7 of circular cross-section, via a circular seat 6, said chamber part 7 narrowing towards and opening centrally of the bottom of the bore 3. The pump body 1 has formed therein a bore 9 which extends radially through said body, in line with the chamber part 5 and which thus opens into said part 5. Located in the bore 9 is a pipe 10, the part of which located outside the the body 5 is intended to be connected to a space (not shown) from which air or gas is to be removed by suction.

The bore 2 and associated screw thread are adapted to fit an externally threaded outlet end of, e.g., a conventional water tap (not shown). Seated on the seat 4 is an annular flange of a nozzle 11 having a single, central nozzle channel 12, which narrows in the intended flow direction and opens into chamber part 5. Resting on the nozzle flange is a sealing ring 13 for sealing the jet pump when connecting the same to the water tap or to some other appropriate driving liquid source.

The bore 3 has screwed therinto a distributor element which comprises a perforated disk or plate 14, a plurality of net-like elements 15 and a substantially cylindrical holder 16, and which is intended to distribute the liquid flowing through the pump over the drainage orifice of the pump formed downstream of the holder 16 and defined by a small inwardly turned collar 18 on the holder 16. The net-like elements 15 rest on the collar 18, whereas the perforated plate rests on a shoulder 19 on the inside of the holder 16. The holder 16 abuts the seat 8 via a sealing ring 21. The seat 8 and the holder 16 surround a drainage chamber 22, the cross-sectional area of which increases abruptly in relation to the outlet part 7. The holes disposed in the perforated plate, which may be of an arcuate shape for instance, are referenced 23, whereas the reference 24 identifies a substantially conical distributor body mounted on the perforated plate 14, said body facing towards the outlet part 7 and having a base surface which is approximately the same size as the smallest cross-sectional area of the outlet part 7. The perforated plate 14 has a thickness which is at least equal to the size of the smallest cross dimension of the holes formed in said plate. The pump is constructed symmetrically around the long axis of the body 1, so that the bore 2, 3, the nozzle channel 12, the chamber parts 5, 7, and the drainage chamber 22 with associated drain orifice 17 are mutually coaxial.

The evacuation line formed by the bore 9 and the pipe 10 incorporates a check valve 26 which prevents the displacement of drive liquid through the line 9, 10. In the case of the illustrated embodiment, the check valve comprises a thin-sheet valve means which is made of rubber or an elastic plastic material for instance, and which is located in the chamber part 5 and covers the inlet end of the evacuation line 9, 10. The valve means is intended to move away from and expose the inlet end of the evacuation line, when an underpressure occurs in the chamber part 5. More specifically, the check valve 26 comprises a hose-like element which abuts against the circumferentially extending wall of the cylindrical chamber part 5 and rests on the shoulder 6 between the chamber part 5 and the outlet part 7. The two ends of the element 26 are provided with respective recesses 27, so that said ends of the element will rest against the shoulder 6 and contact the nozzle flange solely at parts of the circumference thereof. This construction facilitates the passage of air into the chamber part 5 through the evacuation line 9, 10, when an underpressure prevails in the chamber part 5.

When using the jet pump illustrated in FIG. 1, the pump is connected to a source of driving liquid, e.g. a water tap, and driving liquid is flushed through the pump. The liquid is accelerated in the nozzle channel 12 and passes in the form of a jet through the pump chamber parts 5 and 7 at high speed. In this case, the outlet part 7 of the chamber has a smallest cross-sectional area which is 1.4 to 4.8 and preferably 2 to 3 times as large as the smallest cross-sectional area of the nozzle channel 12, so that subsequent to passing through the chamber part 5, the jet exiting from the nozzle 11 will pass closely adjacent to, but out of contact with, the wall of the outlet part 7, even at the region of smallest cross-section of the outlet part 7. The jet will therewith entrain gas present in the pump chamber 5, 7, so as to create a high vacuum in said chamber and in the evacuation line 9, 10, thereby causing gas to be sucked into the pump through the line 9, 10, this gas exiting from the chamber 5 together with the liquid jet flowing through said chamber. The jet of driving lquid and the entrained gas pass from the outlet part 7 into the abruptly widened portion formed by the drainage chamber 22, in which the jet comes into contact with the conical distributor body 24 and is spread and distributed over the perforated plate 14, while correspondingly decreasing in speed and pressure. The liquid and the gas entrained therewith now pass through the holes 23 and the net-like elements 15. The major part of the diffusion process takes place in the net-like elements 15, with further distribution of the luquid over the cross-section of the pump, before finally departing in the form of a homogeneous, gas laden and gentle jet which fills the whole cross-section of the outlet orifice 17. A multiple of fine mash net-like elements 15, e.g. from 4 to 10 such elements, may be provided, the net-like elements in the region covered by the outlet orifice 17 having a total open mesh area which is suitably from 6 to 20 times and preferably from 8 to 16 times larger than the smallest area of the nozzle channel 12 or than the area which determines the diameter of said jet. The area of the drainage orifice 17 shall exceed the open area of the net-like elements 15 and shall be from 15 to 45, preferably from 20 to 40 times larger than the smallest area of the nozzle channel 12, i.e. in normal cases, the the area of the nozzle orifice. An advantage is afforded, when the area of the perforatins in the perforated plate 14 is from 5 to 15 times greater than the smallest area of the channel 12. A vacuum of 95% or more is obtained in the pump chamber 5, 7 with the preferred area ratios and with standard water pipe pressure and cold water temperature. The distance between the nozzle orifice and the drainage orifice 17 will advantageously be such as to be less than six times the square root of the area of the drainage orifice, thereby providing a short pump which may be left installed, e.g., on a water tap and therewith function as an air delivery device when not used for evacuation purposes.

Figure 2:
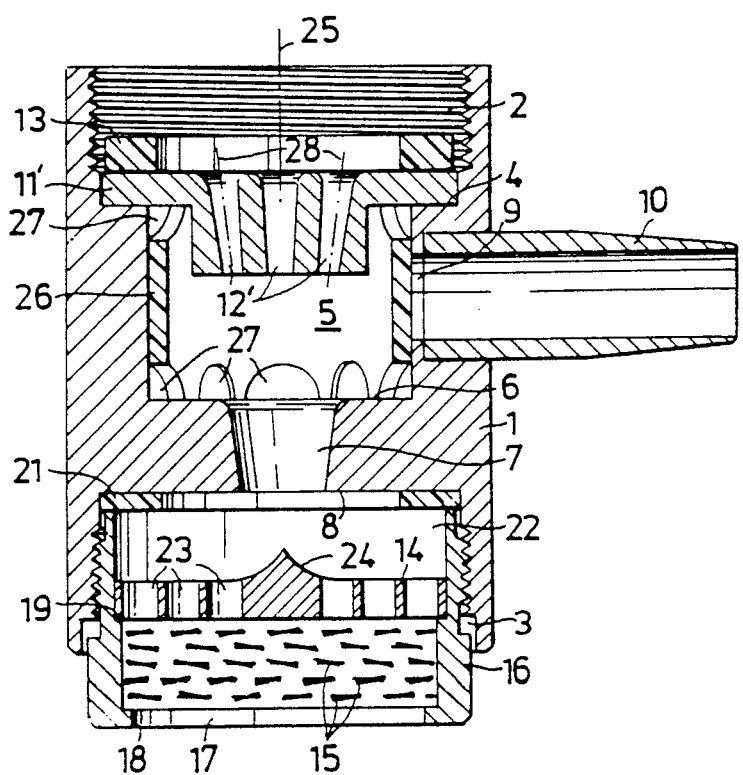
FIG. 2 is an axially sectional view of a second embodiment of the inventive liquid driven pump.

In the embodiment illustrated in FIG. 2, the reference signs 1–10, 14–19 and 21–27 have the same significance as those in FIG. 1. The only difference between the jet pump illustrated in FIG. 2 and the jet pump illustrated in FIG. 1 is essentially that the nozzle 11' of the FIG. 2 embodiment resting on the shoulder 4 via an annular flange is provided with a plurality of nozzle channels 12'. As indicated by the channel axes 28, the channels 12' are directed essentially towards one and the same point, such that the jets exiting therefrom will be united in the outlet part 7 of the pump chamber. The use of a plurality of jets increases the contact area between the drive liquid and the gas present in the chamber 5, 7, therewith resulting in greater efficiency.

Figure 3:
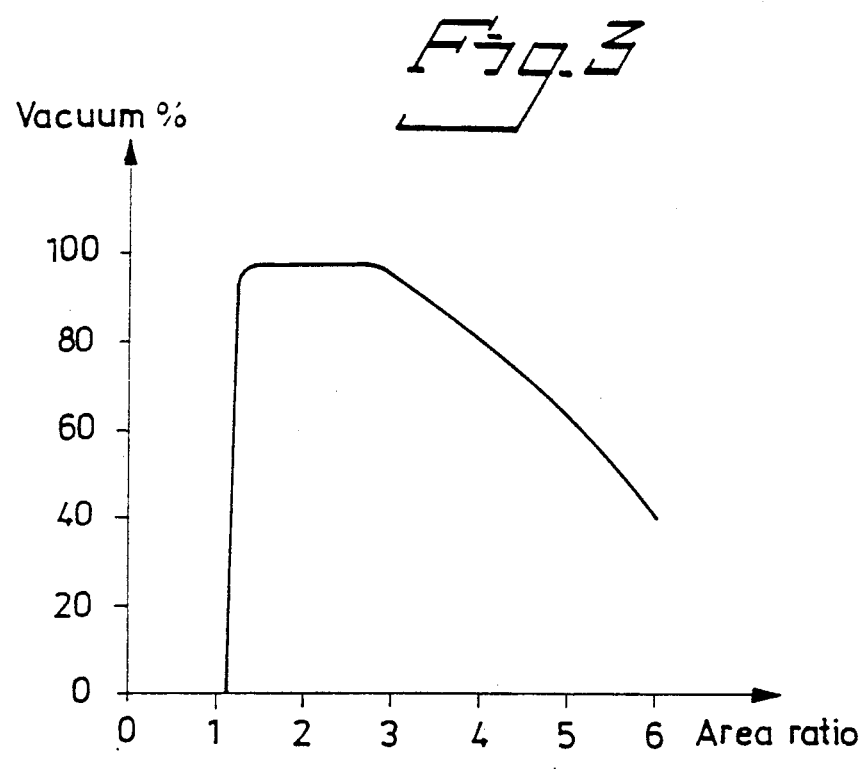
FIG. 3 is a diagram which illustrates the vacuum level which can be achieved with the pump of FIG. 1 or FIG. 2 at a given water pressure and at different area ratios between the smallest cross-section of the outlet part and the nozzle orifice.
Figure 4:
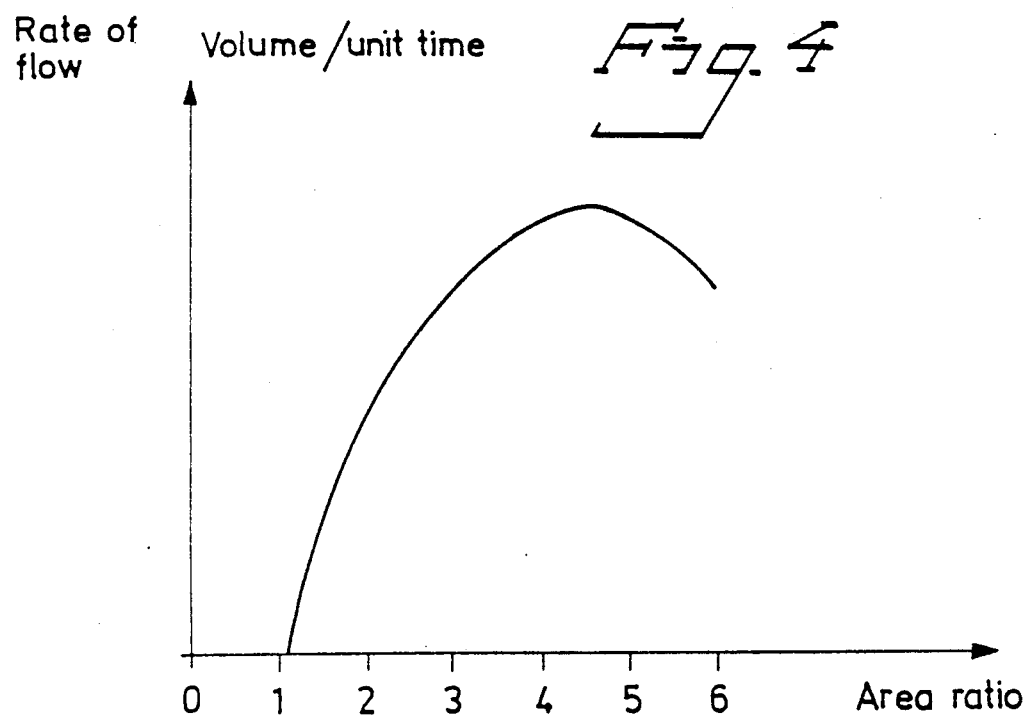
FIG. 4 illustrates the variation in gas flow through the jet pump according to FIG. 1 or FIG. 2 at the different area ratios shown in FIG. 3. Like or similar elements in the drawings have been identified in the two Figures with the same reference signs.

FIG. 3 illustrates the level of vacuum, expressed as a percentage of absolute vacuum, which is obtained with the various ratios between the samllest cross-sectional area of the outlet part 7 and the orifice area of the the nozzle 11 or 11' in the case of a water-driven jet pump substantially of the construction illustrated in FIG. 1 or 2 and at a water pressure of about 300 kPa. It will be seen that the most powerful vacuum, i.e. in this case the vacuum which corresponds to the water vapour pressure at prevailing temperature, is achieved with an area ratio of between 1.4 and 2.6. FIG. 4 illustrates the gas flow through the evacuation line 10 at different area ratios in accordance with the aforegoing, with the evacuation line open to atmosphere, which can be said to have a 0% vacuum. As will be understood, the gas flow will increaase up to an area ratio of about 4.8 and will then again decrease. With respect to both the possible level of vacuum and to the gas flow, an optimum area ratio is about 2–3.

The invention is not restricted to the described and illustrated embodiments thereof, but can be realized in any desired manner which lies within the scope of the inventive concept as defined in the following claims.

I claim:

1. A liquid-driven jet pump, comprising a drive-liquid accelerating nozzle having a nozzle orifice which opens into a pump chamber having an outlet part which is substantially coaxial with the accelerating nozzle, the area of the nozzle orifice being smaller than the smallest cross-sectional area of the outlet part, an evacuation line which is intended to be connected to a space to be evacuated, said pump outlet part discharging into a substantially coaxially arranged drainage chamber whose cross-sectional area increases abruptly in relation to the outlet part and which cross-sectional area is at least 3¼ times greater than said outlet area when seen perpendicularly to the axial direction of the outlet part, and a drainage orifice which determines the shape of the exiting jet, characterized by the combination that the relationship between the respective smallest cross-sectional areas of the nozzle orifice and the outlet part is between 1:1.4 and 1:4.8 and the distance between the nozzle orifice and the drainage orifice is less than six times the square root of the drainage orifice area so that the whole of the diffusion process, or at least the full predominant part of said process, will take place through the agency of a multiple of net-like elements located in the drainage chamber and through-passed by the liquid; and further characterized in that the orifice area of the drainage orifice is 15 to 45 times larger than the area of the nozzle orifice.

2. A pump according to claim 1, characterised in that the smallest cross-sectional area of the outlet part is from 2 to 3 times larger than the nozzle orifice area; in that a perforated plate located in the drainage chamber on the upstream side of the net-like elements has a total hole area which is from 5 to 15 times larger than the nozzle area; in that the open mesh area of the net-like elements is from 6 to 20, times larger than the nozzle orifice area; and in that the drainage nozzle area is from 20 to 40 times larger than the nozzle orifice area.

3. A pump according to claim 2, characterised in that the perforated plate has a thickness which is at least equal in size to smallest cross dimension of the holes formed therein.

4. A pump according to any one of claim 1, characterised in that the nozzle is provided with a multiple of nozzle channels.

5. A pump according to claim 2, characterized in that a distributor means located in the drainage chamber includes a substantially conical distributor body which faces upstream towards the outlet part and which has a base area which is substantially of the same size as the area of the outlet part, so as to distribute the liquid entering the drainage chamber substantially uniformly over the perforated plate and the net-like elements.

6. A pump according to claim 1, in which a check valve is arranged to coact with the evacuating line, characterized in that the check valve includes a sheet-like valve means which is located in the pump chamber and covers the inlet end of the evacuation line, said sheet-like valve means being intended to move away from and expose the said inlet end when an underpressure prevails in the pump chamber;

in that the part of the pump chamber located upstream of the outlet part is substantially cylindrical in shape;

in that the check valve comprises a hose-like element having an outer diameter which corresponds to the inner diameter of the cylindrical part;

in that the hose-like valve means rests on a radial abutment surface between the cylindrical part of the pump chamber and the outlet part; and in that at least the one end of the hose-like element is provided with recessesd so shaped that said end of said element will rest on said radial abutment surface solely along certain parts of its circumference.

7. A pump according to claim 2, characterized in that the open mesh area of the net-like elements is from 8 to 16 times larger than the nozzle orifice area.

8. A pump according to claim 4, wherein said nozzle channels extend towards a common point in the region of the pump chamber outlet.

* * * * *